UNITED STATES PATENT OFFICE.

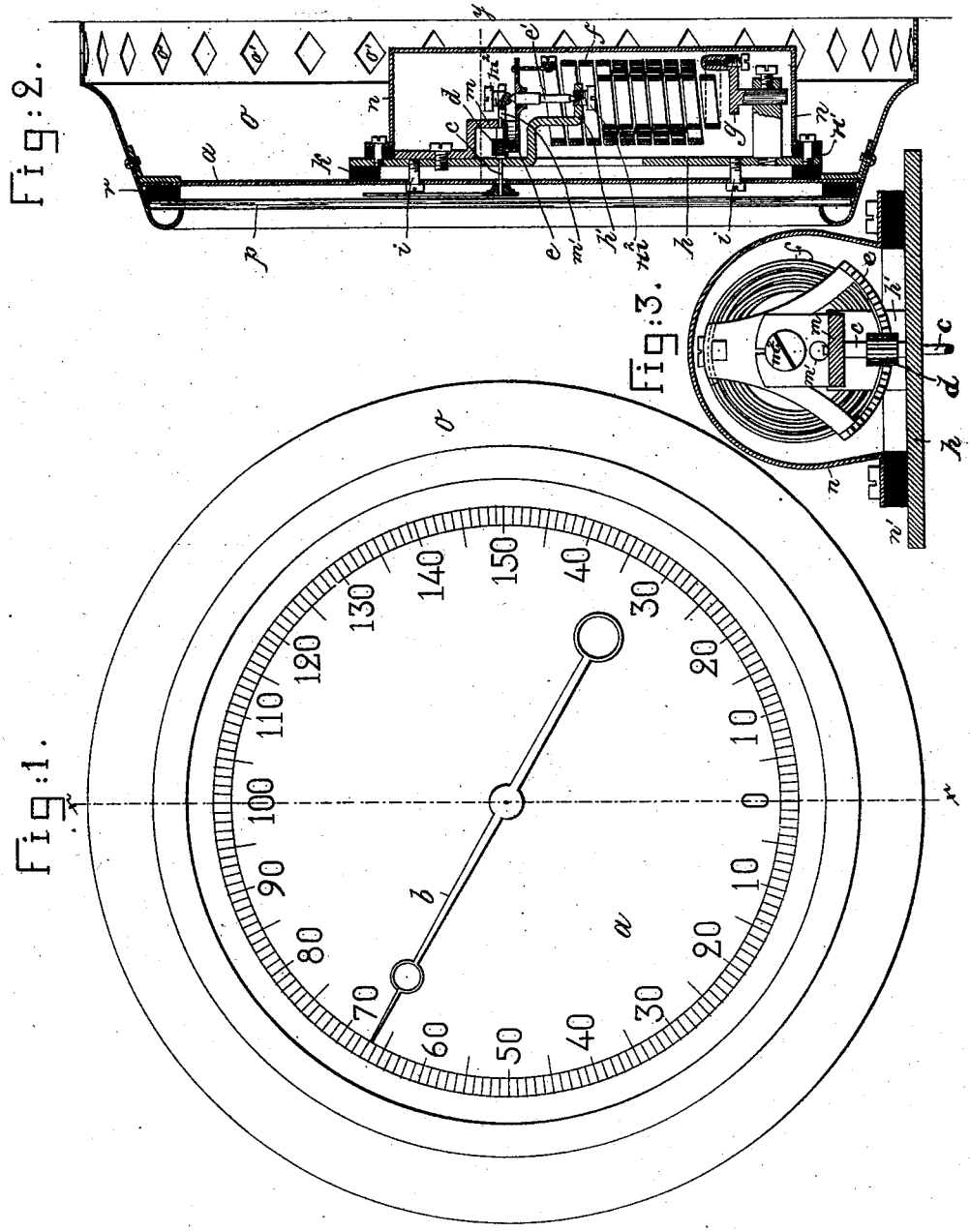

EDGAR W. UPTON, OF PEABODY, MASSACHUSETTS.

METALLIC THERMOMETER.

SPECIFICATION forming part of Letters Patent No. 367,869, dated August 9, 1887.

Application filed July 19, 1884. Serial No. 138,167. (No model.)

*To all whom it may concern:*

Be it known that I, EDGAR W. UPTON, of Peabody, county of Essex, State of Massachusetts, have invented an Improvement in Thermometers, of which the following description, in connection with the accompanying drawings, is a specification, like letters on the drawings representing like parts.

My invention relates to thermometers of that class in which a pointer is moved by the expansion and contraction of a solid metal; and the object of the invention is to improve and simplify the construction, and thus make an improved thermometer at less cost than those heretofore made.

The invention consists in various details of construction, which will be hereinafter pointed out.

Figure 1 is a front elevation of a thermometer embodying this invention; Fig. 2, a vertical section thereof on line $x\,x$, Fig. 1; and Fig. 3, a transverse section on line $y$, Fig. 2, on a larger scale.

The temperature is indicated on a graduated dial, $a$, by means of a pointer, $b$, connected with an arbor, $c$, provided with a pinion, $d$, meshing with a toothed segment, $e$, operated by the expansion or contraction of a thermal strip, $f$, connected at one end with the said segment $e$, and made fast at its other end by an adjustable attaching device, $g$, the general arrangement and combination of the said elements forming no part of the present invention.

The pointer-actuating mechanism, consisting of the pinion, segment, and thermal strip, are all supported on a plate or frame-work, $h$, connected with the dial $a$ in any suitable manner, as by the screws $i$, there being a suitable washer or gasket, $k$, of yielding material, preferably rubber, inserted between the said dial and plate $h$, forming an air-tight joint between them. A portion of the plate $h$ is struck up to form a bracket, $h'$, for supporting the pivotal bearing or socket for the arbor $e'$ of the gear $e$, the other end of the said arbor having its pivot supported by a bracket, $m$, which also constitutes the bearing for one end of the pointer-arbor $c$, the said bracket being bored, as shown at $m'$, to facilitate the boring of the socket for the said arbor.

The ends of the arbor $e'$ are pointed to form pivots, and the steps or bearings for the said pivots are both adjustable, being, as shown in this instance, made as screws $m^2$, which may be turned into the brackets $m$ and $h'$, thereby moving the arbor $e'$ longitudinally until the teeth of the gear $e$ mesh properly with those of the pinion $d$.

The thermal strip $f$, composed of two metals having different rates of expansion, is made in helical form, and, in order to give it great length in as small a space as possible, it is composed of a series of concentric helices, the extremity of the outer one of which is connected with the segment $e$, while the extremity of the inner coil is connected with the attaching device $g$.

In order to protect the operative parts when the thermometer is used in an exposed position, the said parts are inclosed in a thin case, $n$, which fits as closely around the operative parts as possible without interfering with their movement, the said case being connected with the plate $h$, and there being a yielding washer, $n'$, inserted between the said plate and case to make a packed or tight joint.

By making the case small there is only a small amount of air surrounding the thermal strip $f$, so that the said air and the strip within it quickly assume the temperature of the atmosphere or material at the outside of the case $n$, thus making the thermometer very sensitive, although protecting the thermal strip from the direct action of moisture or any material that might injure it.

The dial, together with the operating parts inclosed in the case $n$, is supported in an outer frame or annular shell, $o$, provided at its front with a glass plate, $p$, which covers and protects the dial and pointer, and a yielding washer, $r$, placed between the said plate and dial, thus making a packed tight joint. The said frame $o$ may be left open at the back or not, as preferred, and it is provided with a series of openings, $o'$, which not only give it an ornamental appearance, but also permit a free circulation of air from within the said frame to the outside thereof, so that when the thermometer is used to indicate the temperature of the atmosphere the air will circulate freely around the case $n$, keeping the thermal strip $f$ therein at the temperature of the surrounding atmosphere. It will be seen, also, from Fig. 2 that the frame $o$ extends rearwardly of the case $n$ and so removes that case from contact with the wall or other fixture upon which the thermometer is hung, and thus preserves the thermometer from the thermal influences of such fixture.

With the exception of the fact that the thermal strip is made in several concentric coils, it is of usual construction, being composed of layers of metal having different rates of expansion by heat, so that a change in temperature causes the said strip to twist in its length, or produces a rotary movement of one end of the coil relative to the other.

The two materials most commonly employed for the thermal strip are iron or steel and brass; but various other combinations of two or more metals have been used, any of which may be employed in connection with the present invention.

It will be seen that the toothed segment and pinion, or connecting mechanism between the pointer and actuating-strip, have their arbors at right angles to one another, so that the strip is arranged with its axis parallel with the dial, thus greatly economizing space.

I claim—

1. The dial, pointer, and helical thermal strip having its axis parallel with the said dial, and connecting mechanism between the said pointer and strip, combined with a case inclosing the said strip at the rear of the dial, and a frame surrounding and inclosing the said dial and case, the said frame having openings for the admission of the surrounding atmosphere, substantially as described.

2. The thermal strip, actuating toothed segment connected therewith, and pointer having its arbor provided with a pinion meshing with the said segment, combined with the supporting-plate having a struck-up portion provided with a bearing or step for one end of the arbor of the said segment, and a bracket provided with a bearing for the other end of said arbor and for that of the said pinion, substantially as described.

3. The thermal strip composed of a series of concentric helices, substantially as described.

4. The pointer and pinion, and the thermal strip and its attached toothed segment, meshing with said pinion, combined with the arbor $c'$ of said segment, brackets $h'$ and $m$, and the arbor-adjusting devices $m^2 m^2$ in said brackets and arranged to engage opposite ends of the said arbor to insure the proper engagement of the teeth of the segment and pinion, substantially as described.

5. A thermometer comprising a dial and pointer, and a thermal strip and connecting-gearing between the said strip and pointer, and a supporting frame-plate for the said strip connected with the said dial, a glass over the said dial having a packed or tight connection therewith, and a case for the thermal strip having a packed or tight joint with the frame-plate, which has a packed or tight joint where connected with the dial, the entire operating mechanism of the thermometer thus being inclosed in an air-tight space or chamber, substantially as described.

6. In a thermometer, a dial and pointer, and a thermal strip, and connecting mechanism between said pointer and strip, combined with an inclosing-case and a surrounding frame for supporting the case free from contact with the surface upon or against which the thermometer rests, substantially as described.

In testimony whereof I have signed my name to this specification in the presence of two subscribing witnesses.

EDGAR W. UPTON.

Witnesses:
 JOS. P. LIVERMORE,
 W. H. SIGSTON.